(12) United States Patent
Levy et al.

(10) Patent No.: US 6,640,279 B2
(45) Date of Patent: *Oct. 28, 2003

(54) VIRTUAL MACHINE WITH SECURELY DISTRIBUTED BYTECODE VERIFICATION

(75) Inventors: Moshe Levy, Sunnyvale, CA (US); Judy Schwabe, San Mateo, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/283,305

(22) Filed: Oct. 30, 2002

(65) Prior Publication Data

US 2003/0056054 A1 Mar. 20, 2003

Related U.S. Application Data

(63) Continuation of application No. 09/547,225, filed on Apr. 11, 2000, which is a continuation of application No. 08/839,621, filed on Apr. 15, 1997, now Pat. No. 6,092,147.

(51) Int. Cl.[7] .................................................. G06F 12/00
(52) U.S. Cl. ............................ 711/6; 711/156; 711/163
(58) Field of Search .............................. 711/6, 156, 163

(56) References Cited

U.S. PATENT DOCUMENTS

| | | |
|---|---|---|
| 4,400,769 A | 8/1983 | Kaneda et al. |
| 5,305,456 A | 4/1994 | Boitana |
| 5,740,441 A | 4/1998 | Yellin et al. |
| 5,757,918 A | 5/1998 | Hopkins |
| 5,784,553 A | 7/1998 | Kolawa et al. |
| 5,794,049 A | 8/1998 | Lindholm |
| 5,920,720 A | 7/1999 | Toutonghi et al. |
| 5,999,731 A | 12/1999 | Yellin et al. ................ 395/704 |
| 6,003,038 A | 12/1999 | Chen |
| 6,026,237 A | 2/2000 | Berry et al. |
| 6,075,863 A | 6/2000 | Krishnan et al. |
| 6,093,216 A | 7/2000 | Adi-Tabatabai et al. |
| 6,477,702 B1 | 11/2002 | Yellin et al. ................ 171/126 |

FOREIGN PATENT DOCUMENTS

WO  WO 01/14958  3/2001  ............. G06F/9/00

OTHER PUBLICATIONS

George E. Necula, et al., "Proof–Carrying Code", Nov. 1996, pp. 1–60.

Primary Examiner—David Hudspeth
Assistant Examiner—Fred F. Tzeng
(74) Attorney, Agent, or Firm—Thelen Reid & Priest, LLP; John P. Schaub

(57) ABSTRACT

A system for executing a software application comprising a plurality of hardware independent bytecodes is provided comprising a computing system that generates bytecodes, a virtual machine, remote to the computing system, that receives a plurality of bytecodes from said computing system, and executes said plurality of bytecodes, a system for testing said bytecodes against a set of predetermined criteria in which the testing is securely distributed between said virtual machine and said computing system so that the bytecode verification completed by the computing system is authenticated by the virtual machine prior to the execution of the bytecodes by said virtual machine. A method for distributed bytecode verification is also provided.

42 Claims, 5 Drawing Sheets

VIRTUAL MACHINE WITH SECURELY DISTRIBUTED BYTECODE VERIFICATION

This application is a continuation of application Ser. No. 09/547,225 filed Apr. 11, 2000, which is a continuation of application Ser. No. 08/839,621, filed Apr. 15, 1997 now U.S. Pat. No. 6,092,147.

BACKGROUND OF THE INVENTION

This invention relates generally to an imaginary computing system being executed by a computer system (a virtual machine) and in particular to a virtual machine that may have securely distributed bytecode verification.

A virtual machine (hereinafter "VM") is an imaginary computing machine generated by a software application which is similar to a conventional hardware central processing unit (hereinafter "CPU"), but also has several technological differences. The CPU and the VM both may have an instruction set and may use various different memory areas that may be segmented in some manner. A conventional CPU, as is well known, executes its instructions directly using some electronic hardware logic circuitry located within the CPU. For example, an ADD instruction may be executed by a hardware arithmetic logic unit (ALU) within the CPU. The VM, which is a software implementation being executed by a processor, however, does not execute its sequence of instructions directly using hardware electronic logic circuitry, such as the ALU, but rather converts the sequence of instructions into hardware-specific instructions either through a "last-minute" batch translation process, known as "just-in-time" compilation, or through a real-time interpretation process, known as interpretation. Due to the translation or interpretation, the programs or applications executed by the VM are platform-independent such that the hardware-specific instructions may be executed by any VM, regardless of the underlying operating system being used by the computer system containing the VM. For example, a VM system being executed on a Windows-based PC computer system will use the same instructions as a VM system being executed on a UNIX-based computer system.

The result of the platform-independent coding of a VM's instruction sequence is a stream of one or more bytecodes. These bytecodes are one byte long numerical codes commonly used to represent VM instructions for coding efficiency and compactness. Many different VM system architectures are currently being used in the computer and software industries.

A common characteristic of many VM system architectures is that they contain a built-in bytecode verification system which ensures that the programs or applications that the VM is requested to execute are a sequence of valid combinations of bytecodes and will not result, once translated or interpreted, into faulty execution steps performed by the underlying physical processing unit that is executing the VM system. The faulty execution steps may create errors or illegal accesses to hardware resources. Bytecode verification is particularly important if the physical processing unit and computing architecture executing the VM system is very sensitive to execution errors. It is also particularly important for a VM system that may contain especially valuable data because people may attempt to deceive the VM system with false bytecode in order to obtain access to the valuable data. For example, when the VM system is hosted inside a personal computer or workstation with valuable user files, or when the VM system is inside a product dedicated to participating in financial transactions, such as containing electronic representations of money, it is especially necessary to have a bytecode verification process to prevent unauthorized access to or corruption of the electronic representations of money.

Bytecode verification may be a sophisticated multi-step process which greatly increases the memory required to store the VM system, which complicates the VM's architecture, and which degrades the performance of the VM system. This is especially a problem when the VM is intended to operate within a small; low-cost, portable, yet security-sensitive product, such as a smart card, electronic wallet or other consumer product possibly involved in electronic money transactions. A smart card may be a credit-card sized plastic card with an embedded microcontroller chip that executes some software applications stored on the card, including a VM system, to perform some electronic money transactions, such as debiting the amount of money contained within the smart card. The microcontrollers in these smart cards typically have limited processing power. In addition, a limited amount of memory is available on these smart cards. Thus, a bytecode verification process is especially cumbersome in a smart card system.

Therefore, conventional smart cards that perform bytecode verification on the smart card have degraded processing performance and require a large amount of memory to store the VM system due to the complex bytecode verification process. It is desirable to produce a low-cost, security sensitive product with a VM system that does not diminish the overall level of execution security of the VM system, but significantly reduces the complexity of the bytecode verifier located within the VM system.

Thus, there is a need for a VM system with securely distributed bytecode verification which avoid these and other problems of known devices, and it is to this end that the present invention is directed.

SUMMARY OF THE INVENTION

The invention provides a virtual machine (VM) with securely distributed bytecode verification such that a portion of the bytecode verification occurs outside of the VM system which contributes to a reduction in the overall memory size of the VM and an increase in the overall processing speed of the VM. The invention operates in a bytecode-based file format being executed by a VM located inside of a low-cost silicon chip. The VM may contain a reduced bytecode verification system, while still guaranteeing that the bytecode loaded into the memory of the VM is always being executed with the same level of security as would be provided by a VM system with a complete bytecode verification process. In particular, the functionality of the bytecode verifier located inside a VM may be reduced by shifting a portion of its verification tasks to a remote securely distributed bytecode verifier. The securely distributed verification process, including the remote verifier and the verifier in the VM, retains the overall execution security that would be achieved if the entire verification processes was executed by the VM itself. The reduction of the bytecode verification within the VM also may the amount of data that must be downloaded to the VM since certain data normally used for bytecode verification is no longer needed.

The invention also provides a securely distributed bytecode verification process and system wherein a portion of the bytecode verification process is removed from the VM itself and moved to a remote front-end system located in a secure workstation. The bytecode verification within the remote system may be executed at, or prior to, loading of the bytecode into the VM. The part of the bytecode verification remaining inside the VM is executed when the bytecodes generated by the remote converter are executed within the VM. The remote bytecode verification in the remote system and bytecode verification in the VM are securely linked together through a software application executed within the VM which may determine and authenticate that bytecode currently being loaded into the VM was previously partially verified by the remote system. Thus, the bytecode verification may be distributed over two distinct, but complementary and securely linked computing environments. A particular embodiment of the VM with securely distributed bytecode verification may be a low-cost smart card that includes a VM located within the microcontroller embedded within the smart card.

In accordance with the invention, a system for executing a software application comprising a plurality of hardware independent bytecodes is provided comprising a computing system that generates bytecodes, a VM, remote to the computing system, that receives a plurality of bytecodes from said computing system, and executes said plurality of bytecodes, a system for testing said bytecodes against a set of predetermined criteria in which the testing is securely distributed between said VM and said computing system so that the bytecode verification completed by the computing system is authenticated by the VM prior to the execution of the bytecodes by said VM. A method for distributed bytecode verification is also provided.

DETAILED DESCRIPTION OF THE PREFERRED EMBODIMENTS

The invention is particularly applicable to a virtual machine having securely distributed bytecode verification, and in particular, to a smart card having an embedded microcontroller with a virtual machine with securely distributed bytecode verification. It is in this context that the invention will be described. It will be appreciated, however, that the system and method in accordance with the invention has greater utility.

Broadly, the invention reduces the functionality of the bytecode verifier located inside a VM which may increase the processing speed of the VM and may reduce the memory required to store the VM application itself. The reduction of the functionality of the bytecode verifier located inside the VM may also reduce the amount of data that is loaded into the VM because certain data used for bytecode verification is not needed. The reduction of the functionality of the bytecode verifier may be accomplished by shifting a portion of the VM's bytecode verification tasks to an off-line, remote verifier system which is securely distributed from the VM. The VM with the securely distributed bytecode verification in accordance with the invention retains the same overall execution security that would have been achieved if all the bytecode verification process steps took place within the VM itself. To better understand the secure distribution of the bytecode verification process in a VM in accordance with the invention, a conventional VM without any distributed bytecode verification will be described.

Figure 1:
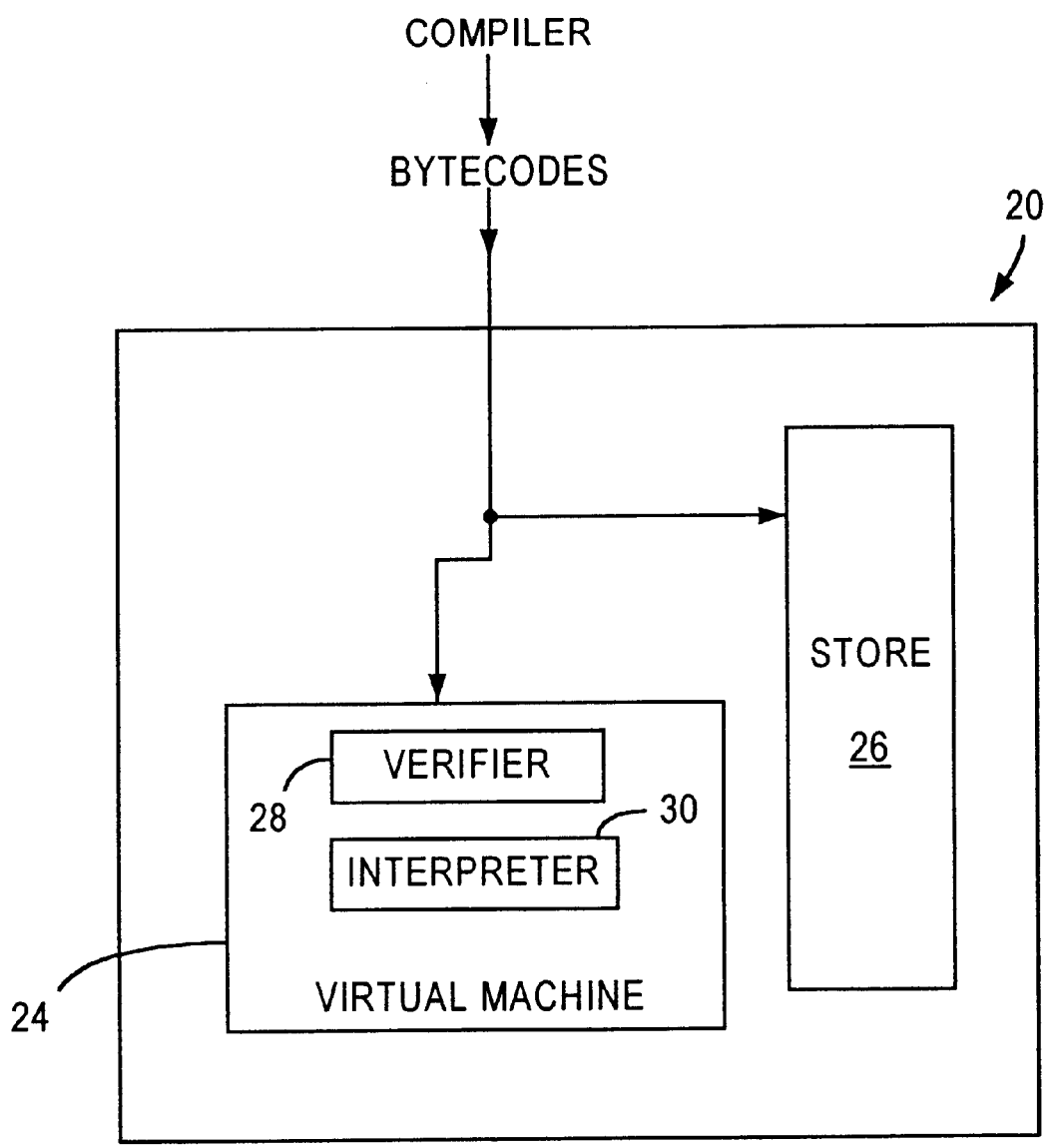
FIG. 1 is a diagram of an example of a conventional virtual machine, such as a smart card.
Figure 2:
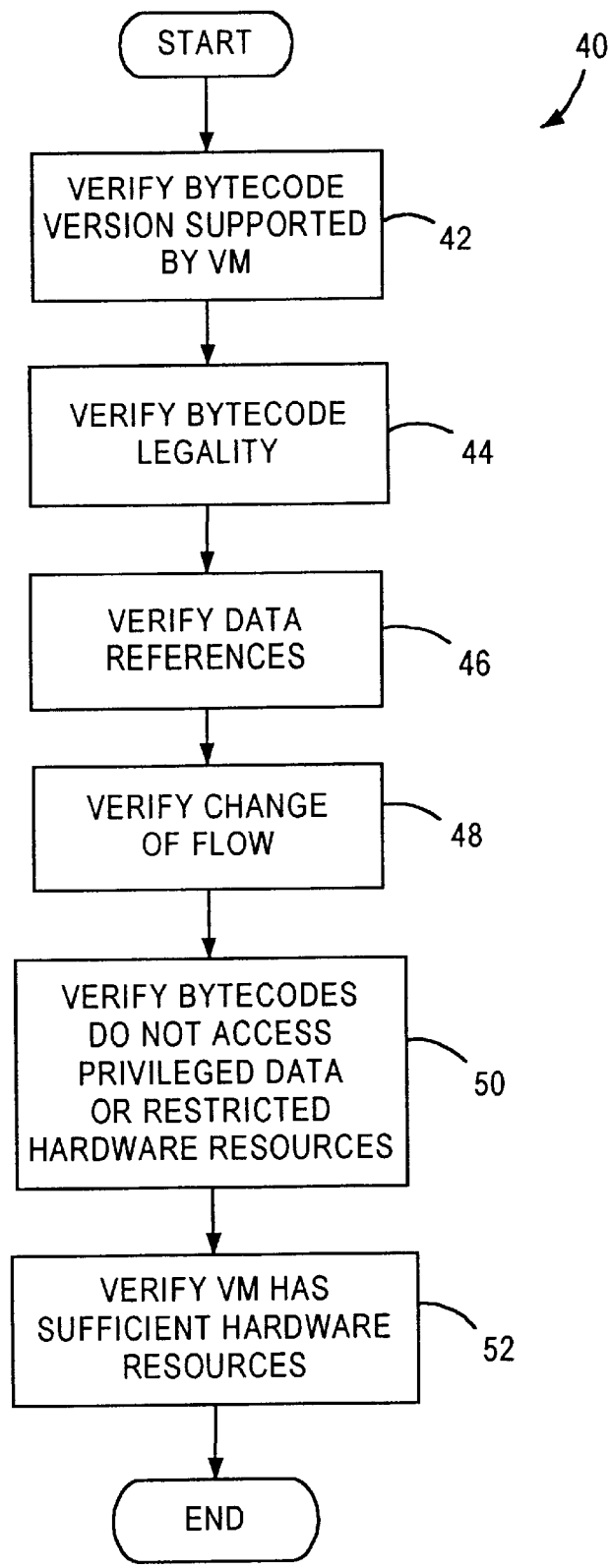
FIG. 2 is a flowchart depicting a conventional bytecode verification method that may occur in a virtual machine.

FIG. 1 is a diagram depicting a conventional VM system 20 that may include a VM 24 and a store 26. The store may be any type of volatile memory, such as RAM, or any type of non-volatile memory, such as an EEPROM or a flash memory attached to the microcontroller and accessible by the VM. The store may store application programs or stored data values, as will be described below in more detail. The VM 24 may include a verifier 28 and an interpreter 30. The verifier may verify incoming bytecodes to ensure that the bytecodes are legal operations and do not access restricted memory areas. In this conventional VM, the entire bytecode verification, as described below with reference to FIG. 2, is executed within the VM 24. This execution of the entire bytecode verification process within the VM 24 may reduce the speed of processing of the microcontroller and may increase the memory needed to store the VM.

Once each bytecode has been verified, it is passed to the interpreter 30 that interprets the bytecodes into hardware specific instructions. The security of a conventional VM is ensured because the bytecode verifier 28 may ensure that any bytecodes entering the VM 24 are valid. In addition, the verifier may also ensure that the bytecodes do not access restricted memory locations within the store 26, such as the locations that store the money value on a electronic wallet. If an invalid bytecode is detected, the bytecode is rejected and discarded so that the interpreter and the VM 24 never interprets the invalid, and potentially harmful bytecode. For example, a bytecode that has been designed maliciously to alter the value of the money stored in the VM would be prevented from entering the VM by the verifier 28. Now, a flowchart depicting a typical bytecode verification process, that may occur within a conventional VM, will be described.

FIG. 2 is a flowchart of a method 40 for bytecode verification that may occur entirely within the conventional VM shown in FIG. 1. The bytecode verification may be a software application executed by the microcontroller that also executes the VM. In step 42, the bytecode verifier may determine whether the version of the bytecodes is supported by the particular VM version since bytecodes are being added and upgraded. Next, in step 44, each bytecode within an application is checked against a list of valid bytecodes to prevent a person from creating a new bytecode which may compromise the integrity of the VM system. All of the data references within the bytecodes may be verified, in step 46, to ensure that any variables, such as "X", referenced in a bytecode, is defined by the application containing the bytecodes or by the VM. Next, any change of flow references (i.e., jump addresses) are verified in step 48, to determine that the references are to bytecodes, since a reference to data may compromise the integrity of the data. Next, in step 50, each bytecode is checked to ensure that each bytecode does not access privileged information, such as a password, or use hardware resources not normally available to a bytecode. Finally, in step 52, the VM confirms that the execution of the bytecodes does not require more resources than those provided by the VM such that the bytecodes may execute on the VM. These bytecode verification steps may occur in any order or simultaneously. A first embodiment of a VM system with securely distributed bytecode verification in accordance with the invention will now be described.

Figure 3:
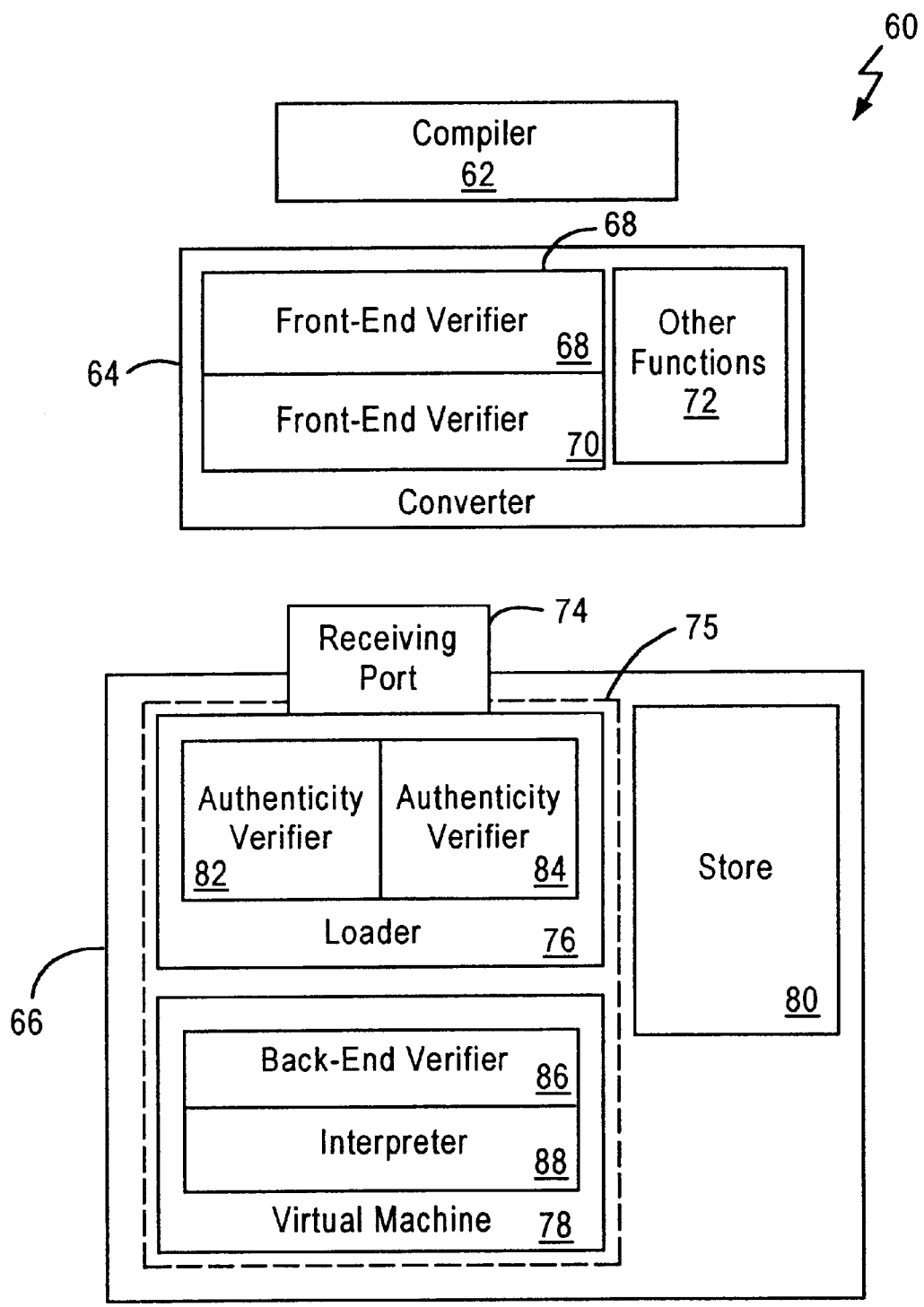
FIG. 3 is a diagram of a first embodiment of a virtual machine with securely distributed bytecode verification in accordance with the invention.

FIG. 3 is a diagram of the first embodiment of a VM system 60 with a securely distributed bytecode verification system in accordance with the invention. A compiler 62 may compile source code instructions into platform-independent bytecodes, as described above, and check the source code for errors, as does any conventional compiler. The VM system may include converter 64 that may be a software application being executed by a computer system, and a tamper-resistant package 66. The converter and the tamper-resistant package may be physically separated from each other. The converter 64, as described below, may perform a portion of the bytecode verification that is usually executed by the VM, and then generates verified bytecodes that may be authenticated by an application executing inside the tamper-resistant package 66. The converter may include a front-end verifier 68, an authenticator 70, and other functions 72. The front end verifier may perform portion of the bytecode verification and the authenticator may generate a code that may be authenticated by the VM, as described below.

The tamper-resistant package 66 may include a receiving port 74 for receiving bytecodes from outside of the tamper-resistant package, a microcontroller 75 for executing the applications being executed within the tamper resistant package, a loader 76, a VM (VM) 78, and a store 80. The loader, as described below, may have an authenticity verifier 82 which verifies the authenticity of the bytecodes received from the converter and other functions 84. The loader may be a software application being executed by the microcontroller 75 inside the tamper-resistant package 66, may be in microcode stored within the microcontroller, may be stored in ROM, or may be hardwired using glue logic. The VM, may also be a software application running on the microcontroller or hardwired combinational and logic circuitry, and may include a back-end verifier 86 and an interpreter 88. The details of the VM will be described below in more detail. The back-end verifier may perform any run-time bytecode verifications, such as checking memory references, that can only be carried out just prior to the execution of the bytecode. Once the bytecodes have been verified by the back-end verifier, the interpreter 88 may interpret the bytecodes into hardware specific instructions that are executed.

Thus, the task of bytecode verification within the VM system 60 has been apportioned between the converter 64 and the back-end verifier 86 in the VM 78 such that the bytecode verification has been distributed between two separate computing devices. The bytecodes passed from the converter to the tamper-resistant package, over a possibly insecure communications channel, are secure because the converter may generate an authentication code, as described below, that the back-end authenticity verifier 82 in the VM 78 may check to ensure that the bytecodes have not been tampered with between the converter and the tamper-resistant package. Thus, the bytecode verification in accordance with the invention has been securely distributed between the VM and the converter which contributes to a reduction in memory size of the VM and a substantial increase in speed of the VM. Now, the details of the converter 64 will be described. The secure distribution of the bytecode verification may also reduce that amount of data that needs to be downloaded into the tamper-resistant package since certain data normally used to carry out bytecode verification, such as data specifying the context of the execution, does not need to be downloaded into the tamper-resistant package.

The converter 64, which may not be physically connected to the tamper-resistant package and may be separated from the package 66 by an insecure communications channel, may generate one or more verified bytecode(s) suitable for execution by the VM 78. The converter may have a converter central processing unit (CCPU), not shown, which executes the application programs such as the front end bytecodes verifier 68 and the authenticator 70. The front end verifier and the authenticator may both be application programs in machine code executing on the CCPU, or in the form of microcode inside the CCPU, or in the form of electronic combinatory and/or sequential logic circuitry, or any combination of the above. The front end bytecode verifier and the authenticator may be combined together, either as a single software application program executing on the CCPU or being stored in a single hardware memory or being combined in a single electronic circuit.

The front end bytecode verifier 68 may verify that one or more bytecodes entering the converter from source outside of the converter, such as compilers or other forms of software application generators, conform to a predetermined set of criteria. The criteria may be similar to the verification steps described above with reference to FIG. 2. Any bytecodes which do not conform to the criteria may be rejected. The resulting verified bytecodes may be transferred to the bytecode authenticator 70. The bytecode authenticator may receive bytecodes exclusively from the bytecode front end verifier and may compute and generate a proof of authenticity, as is well known, on the one or more verified bytecodes using on any suitable cryptographic computation. A suitable cryptographic computation may include, for example, a hash value, a message authentication code using a block-cipher algorithm, or a digital signature using an asymmetric cryptographic algorithm.

The generated proof of authenticity may be attached to the one or more verified bytecode(s) to form one or more authenticated bytecode(s). The authenticated bytecode(s) may then be transmitted to the tamper-resistant package, over a possibly insecure communications channel, at present or at some later time. The proof of authenticity within the bytecode(s) will be invalid if any alteration or modification of the authenticated bytecode(s) has occurred after the bytecodes verification by the converter, but prior to the presenting of the authenticated bytecode(s) to the loader within the tamper-resistant package. The loader in the tamper-resistant package may determine whether the presented bytecode(s) are authentic based on the proof of authenticity. Thus, although the converter and the loader may not be securely physically connected together and may be separated by an insecure communications channel, such as the Internet, the verified bytecodes generated by the converter may be authenticated by the loader within the tamper-resistant package. Thus, the proof of authenticity permits the loader and converter to be separated from each other by an insecure channel, and yet the bytecode verification may be securely distributed between the converter and the VM with no loss in security.

The converter may also contain other functions 72, such as the translation of bytecodes produced by external systems, such as the compiler 62, into a format adapted to be executed by the VM 78. These other functions may be implemented as software applications being executed by the CCPU within the converter, as microcode within the CCPU, as combinational and logic circuitry, or a combination of the above. Now, the details of the tamper-resistant package and the VM will be described.

The tamper-resistant package 66, as described above, may include the VM 78 that may comprise at least the bytecode interpreter 88 and the bytecode back end verifier 86. The interpreter and the back end verifier may be implemented as software applications in machine code executing on a microcontroller within the tamper-resistant package, as microcode within the microcontroller, as electronic combinatory and/or sequential logic circuitry located on the tamper-resistant package, or a combination of any of the above. The interpreter and back end verifier may also be physically combined together either by being combined into a single software application, by being stored within the same memory device, or by being combined in the same electronic hardware circuit. As described above, the back end verifier may perform some limited run-time bytecode verification, such as performing memory access checks, that must be completed just prior to execution of the bytecodes. Thus, the bytecode verification in accordance with the invention is distributed between the front end verifier 68 in the converter and the back end verifier 86 in the VM. The interpreter may interpret the verified bytecodes and perform the hardware functions requested by the bytecodes. The loader 76 will now be described in more detail.

The loader 76 may be physically associated with the VM 78 so that the VM and the loader may be combined into a single software application, may be stored within the same memory device, or may be combined in the same electronic hardware circuit. The loader may be combined with the VM so that the loader processes every bytecode before those bytecodes are received by the VM. Thus, a bytecode must be authenticated by the loader prior to execution by the VM. The loader may also contain the authenticity verifier 82 which may compute a proof of authenticity on the bytecode(s) received from the outside world and compare that proof of authenticity to the proof of authenticity generated by the authenticator 70 in the converter to ensure that someone has not tampered with the bytecodes. As described above, the proof of authenticity may be any type of cryptographic computation, such as, for example, a pre-defined one-way hash value, a message authentication code of a pre-defined form computed with a block-cipher algorithm, or a digital signature of a predefined form computed with an asymmetric algorithm. The authenticity verifier 82 ensures that no bytecode(s) may reach the VM 78 or be executed by the VM unless the authenticity verifier has first successfully verified the authenticity of such bytecode(s). The authenticity of the bytecode ensures that the bytecode verification in the converter was carried out and the bytecode has not been corrupted at any time after the initial verifications by the converter. The loader may also contain other functions 84 that process the bytecode(s) further, such as initialing data elements relative to the availability of hardware resources within the VM for a bytecode, or the resolution of platform-dependent hardware references.

As described above, to further ensure the security of the VM and the close association between the loader, the back end verifier and the interpreter, all of the functional units may be located within the single physically tamper-resistant package 66. The tamper-resistant package may be a plastic encased single semiconductor die, for portable secure products such as a smart card, or may be a mechanically sealed casing for multiple-chip products, such as PIN-pads, or set-top boxes. Now, the bytecodes store 80 will be described.

The bytecode store 80 may store one or more bytecode(s) verified by the authenticity verifier 88 for further processing by the bytecode back end verifier 86 and bytecode interpreter 83. The bytecode store may also be useful in cases where the back end verifier and the interpreter may have to process the same bytecode several times without having access to the bytecode(s), or without being able to reload the bytecode(s) from the outside world. In a particular type of VM, such as a portable smart card, the bytecode store may be non-volatile memory, such as an electrically erasable, programmable read only memory (EEPROM) or a flash memory so that bytecodes stored in the store 80 are retained even when no electrical power is supplied to the smart card. The bytecode store may be physically combined with the back end verifier, the interpreter and the loader in that all of these different units may be combined into a single software application, may be stored within the same memory, or may be combined in the same electronic hardware circuit.

The bytecode receiving port 74 may receive bytecode(s) from the outside world and may communicate those bytecode(s) directly to the loader 76 for authenticity verification by the authenticity verifier 82. The bytecode receiving port may be a physical communication line, but may also be an electrical connector, such as a hardware socket. The bytecode receiving port is only communications path by which bytecode(s) may enter the tamper-resistant package. The bytecode receiving port also communicates all bytecode (s) only to the loader so that all the bytecode(s) must be authenticated by the authenticity verifier 82 within the loader prior to reaching the bytecode store 80, the back end verifier 86, or the interpreter 88, which further increases the security of the VM. The receiving port may be physically attached to the tamper-resistant package.

The front end verifier 68 in the converter 64 and the back end verifier 86 in the VM 78 are complementary in that they together provide the full bytecode verification process that would normally be present in a conventional VM system. Thus, the bytecode verification in accordance with the invention has been securely distributed between the converter and the tamper-resistant package which may reduce the memory size of the VM within the tamper-resistant package. The bytecode authenticator 70 in the converter and the bytecode authenticity verifier 82 in the loader 76 also perform complementary functions in that the proof of authenticity generated by the authenticator 70 may be verified by the authenticity verifier 82. Thus, the bytecode verification process in accordance with the invention has been apportioned between the two systems. The security provided by the authenticators permits the two portions of the bytecode verification to be securely distributed, in accordance with the invention, while being physically separated from each other by a insecure communications channel. Now, a method for bytecode verification in a securely distributed bytecode verification system in accordance with the invention will be described.

Figure 4:
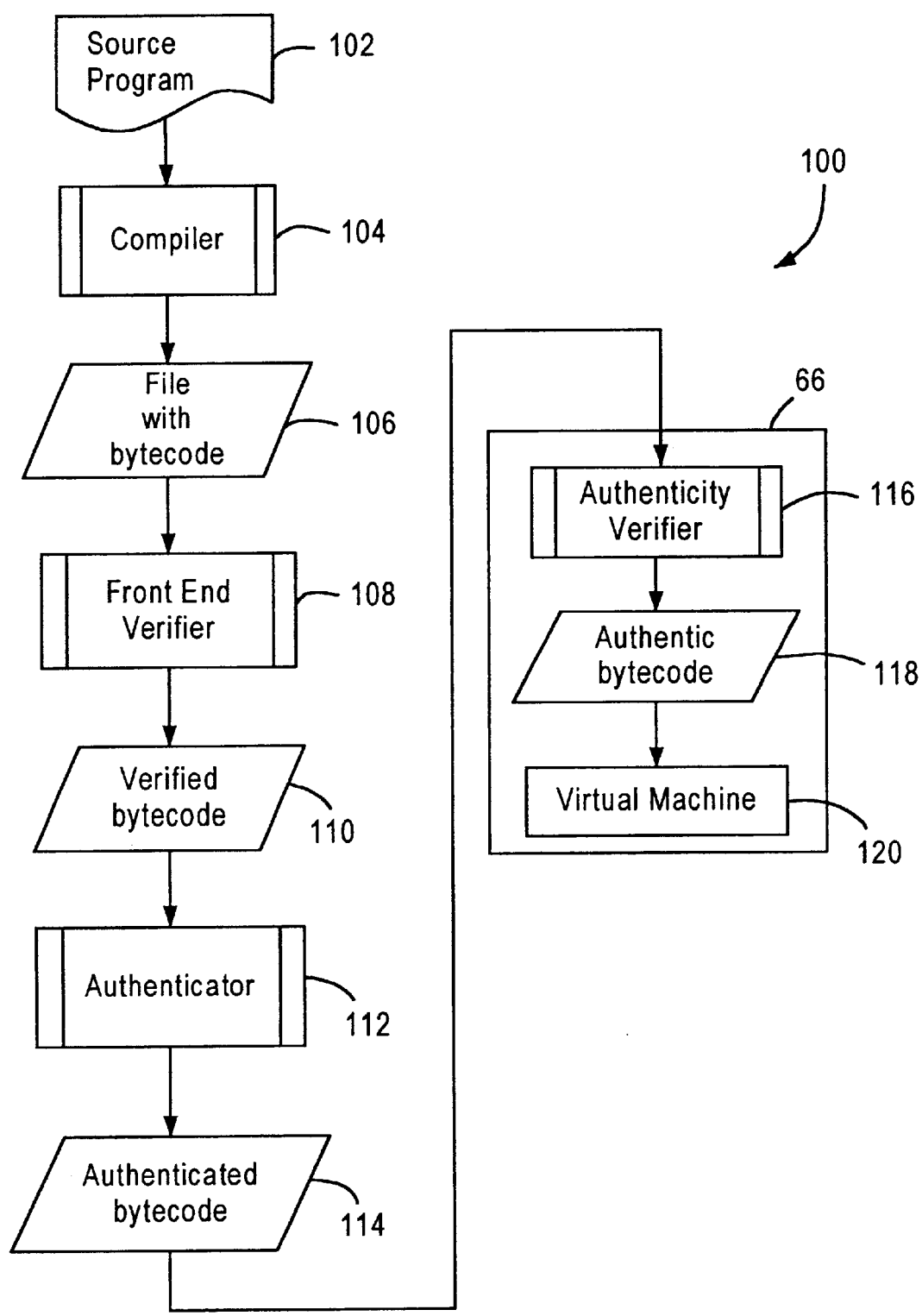
FIG. 4 is a flowchart depicting a method of securely distributing the bytecode verification process within a virtual machine system in accordance with the invention.

FIG. 4 is a flowchart of a method 100 for bytecode verification using a securely distributed bytecode verification system in accordance with the invention. The method permits a VM to execute its bytecode(s) securely while distributing the bytecodes verification securely between the VM and the remote system. In a first step 102, a software application to be executed by the VM is generated in a conventional manner, such as by writing application code in a source language and running that generated source code through a compiler in step 104 to produce a file, in step 106, that contains the platform-independent bytecode(s). The file is then input to the converter, in step 108, where it is first handled by the front end verifier. The front end verifier may produce, as a result of the verification, either the verified bytecode(s) in step 110, or provide the programmer with warning and error messages indicating where the verification process has encountered problems so that the programmer can correct the relevant problems in his source code and rerun the source file through the compiler and the front end verifier again to produce the verified bytecode(s).

The verified bytecode(s), in step 112, may then be handled by the authenticator in the converter where a proof of authenticity may be generated, as described above, and the proof of authenticity may be appended to the verified bytecode(s) to produce an authenticated bytecode file in step 114. The authenticated bytecode file may then be transmitted either immediately or at a later time over an insecure communications channel, to the loader in the VM which is in the tamper-resistant package 66, in step 116, where it is first processed by the authenticity verifier. The bytecode authenticity verifier may verify the proof of authenticity attached to the verified bytecode(s) to determine whether the verified bytecode(s) present in the authenticated bytecode(s) have been accidentally or intentionally modified or altered since the verification of the bytecode(s) by the front end verifier. The verification of the proof of authenticity may be carried out through cryptographic computations, such as the verification of a one-way shadow of the file (hash value), the verification of a symmetric message authentication code, or the verification of an asymmetric digital signature. If the authentication fails, the loader prevents the bytecode(s) from gaining access to the VM. The bytecode(s) may be denied access to the VM by, for example, invalidating the bytecode contents of the authenticated file by deleting them or replacing them by illegal bytecodes, not storing the bytecodes in the bytecode store if the store is the only memory location that may store the bytecodes, or sending a warning message to the potential user of the VM that the bytecodes are illegal or corrupted. If the authentication is successful, then in step 118, the authenticated bytecode may be made available to the VM either directly or by storing it in the bytecode store. In step 120, the authenticated bytecode may be finally executed by the VM which may use its built-in back end bytecode Verifier to complete the verification of the bytecode(s), such as those verifications which can not be carried out before run-time because on-the-fly address resolutions or those verification that require other initializations prior to completing the verification. An interpreter in the VM may then convert the bytecodes into hardware specific instructions. Now, a second embodiment of the VM having securely distributed bytecode verification in accordance with the invention will be described.

Figure 5:
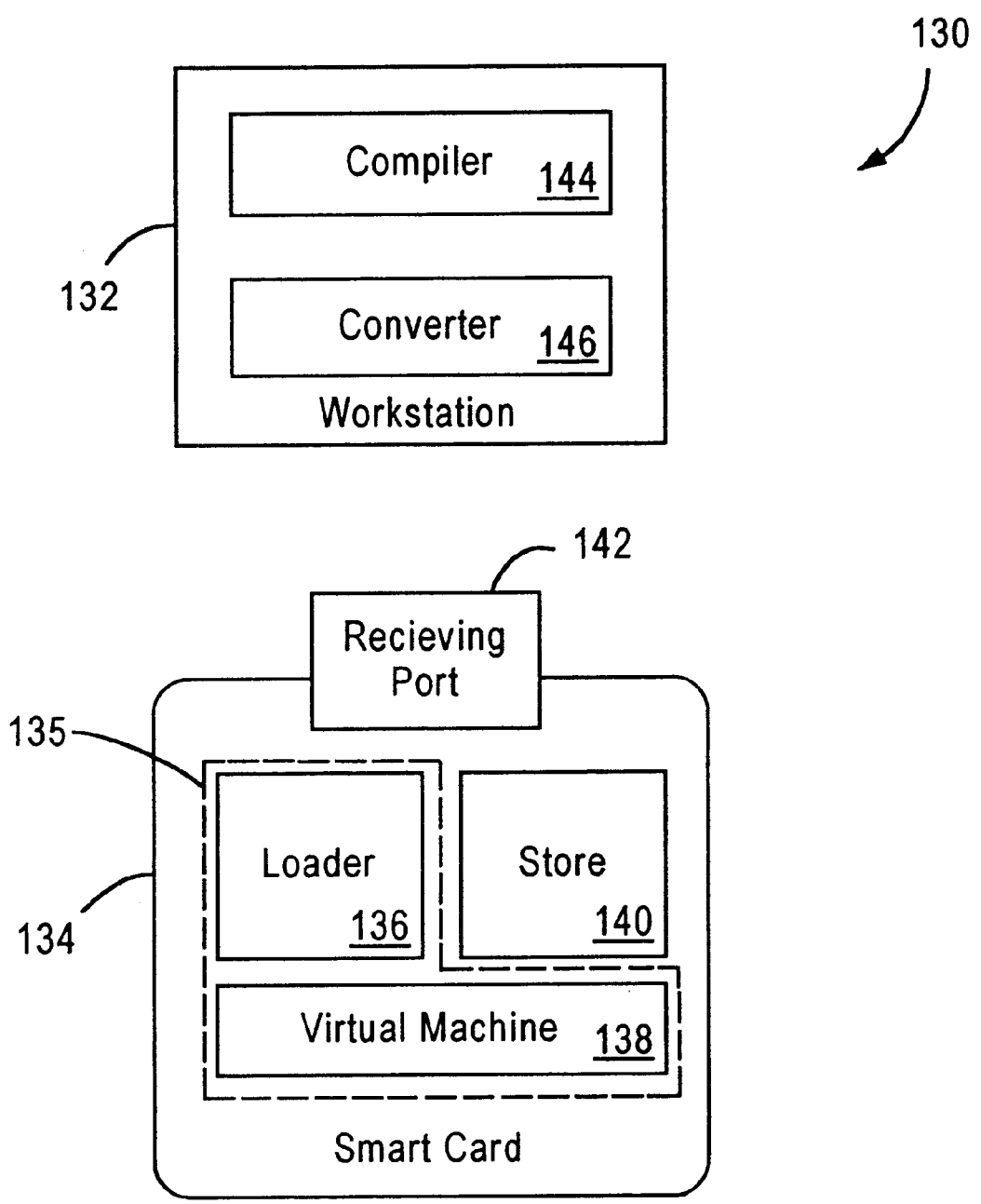
FIG. 5 is a diagram of a second embodiment of a virtual machine, that may be a smart card, with securely distributed bytecode verification in accordance with the invention.

FIG. 5 is a diagram of a second embodiment of a VM system 130 with a securely distributed bytecode verification system in accordance with the invention. The VM system may comprise a computer 132, such as a workstation, and a secure portable token 134, such as a smart card. The blocks described below perform the same functions as the like-named blocks described above and the details of these blocks will not be described here. The secure portable token 134 may comprise a tamper-resistant microcontroller 135 embedded within the secure portable token, which executes a loader application 136 and a VM 138, as described above. The secure portable token may also comprise a bytecode store 140 and a receiving port 142, as described above. The computer may have a process or (not shown) which executes a compiler application 144 and a converter application 146, both of which were described above. The compiler and the converter may both be located and stored on a computer, such as a software development workstation, either as a single software application or two separate software applications. In this embodiment, a portion of the bytecode verification may be conducted by the converter application being executed by the workstation 132 and a portion of the bytecode verification may be conducted by the back end verifier within the VM 138 which is within the smart card. Thus, the bytecode verification may be securely distributed between the workstation and the portable secure token, such as a smart card or an electronic wallet. Now, a preferred distribution of the bytecode verification between a VM and a remote computer will be described.

The bytecode verification may be securely distributed between a VM and a remote computing device. The various steps in bytecode verification are described above with reference to FIG. 2. In accordance with the invention, a portion of the bytecode verification process occurs in the remote computing device. In a preferred VM system, a majority of the verification steps may be carried out by the remote computing device. In particular, the steps of confirming the version of the bytecode, confirming that the bytecode is supported by the VM, confirming data references, confirming jump addresses, confirming that no unauthorized data or hardware resources are accessed, and confirming that the VM has sufficient resources may all be carried out within the remote computing device. Since a large portion of the bytecode verification may be completed by the remote computing device, the back end bytecode verifier in the VM may do minimal memory access verification, such as ensuring that a bytecode does not gain unauthorized access to memory areas containing secure data. Thus, the bytecode verification has been securely distributed between a VM and a remote computing device.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A system for executing a software application comprising a plurality of hardware independent bytecodes, the system comprising:

a computing system that generates bytecodes;

a virtual machine remote to the computing system, said virtual machine configured to receive a plurality of authenticated bytecodes from said computing system and to execute said plurality of authenticated bytecodes;

means for testing said bytecodes against a set of predetermined criteria; and means for securely distributing said testing means between said virtual machine and said computing system so that bytecode testing completed by said computing system is authenticated by said virtual machine prior to the execution of said authenticated bytecodes by said virtual machine.

2. A virtual machine for executing a software application comprising a plurality of bytecodes, the virtual machine being executed by a hardware processor, said virtual machine configure to:

receive an authenticated bytecode, said authenticated bytecode being previously compared against a predetermined set of criteria and having a proof of authenticity;

determine whether said authenticated bytecode is corrupted based at least in part on said proof of authenticity; and execute said bytecode.

3. A system for executing a software application comprising a plurality of bytecodes, the system comprising:

a computer system configured to verify that a bytecode conforms to a predetermined set of criteria to generate a verified bytecode, said computer system further configured to generate an authenticated bytecode from said verified bytecode; and a virtual machine remote from said computer system and for executing said authenticated bytecodes, said virtual machine configured to receive said authenticated bytecodes, determine whether said authenticated bytecodes are corrupted and execute said authenticated bytecodes.

4. A smart card having a microcontroller embedded therein, the smart card comprising:

a virtual machine being executed by a microcontroller, said virtual machine executing a software application comprising a plurality of previously verified bytecodes, said virtual machine configured to:

receive an authenticated bytecode, said authenticated bytecode being previously compared against a predetermined set of criteria and having a proof of authenticity;

determine whether said authenticated bytecode is corrupted based at least in part on said proof of authenticity; and execute said bytecode.

5. A method for executing a software application on a virtual machine, the application comprising a plurality of bytecodes, comprising:

receiving an authenticated bytecode by a virtual machine, said authenticated bytecode being previously compared against a predetermined set of criteria and having a proof of authenticity;

determining whether said authenticated bytecode is corrupted based at least in part on said proof of authenticity; and executing said bytecode.

6. A virtual machine for executing a software application comprising a plurality of bytecodes, the virtual machine being executed by a hardware processor, the virtual machine configured to:

receive data comprising a plurality of authenticated bytecodes, said authenticated bytecodes being previously compared against a predetermined set of criteria to reduce the amount of data received by said virtual machine;

determine whether said authenticated bytecodes are corrupted; and execute said bytecodes.

7. An apparatus for controlling a device having an external port and a microcontroller configured to execute a virtual machine, the apparatus comprising:

means for receiving through the external port, code including virtual machine code for use by said virtual machine;

means for determining whether said code is authentic in response to an indicator of authenticity provided within said code; and means for, if said code is determined to be authentic, omitting verification that said virtual machine code conforms to at least some of a predetermined set of criteria, and operating said virtual machine according to said virtual machine code.

8. The apparatus of claim 7 wherein said means for omitting at least some verification comprises means for omitting substantially all verification.

9. The apparatus of claim 7 wherein said virtual machine code comprises bytecode.

10. The apparatus of claim 9 wherein said means for operating said virtual machine further comprises means for interpreting said bytecode.

11. The apparatus of claim 7 further comprising means for, if said code is determined to be authentic, verifying said virtual machine code conforms to at least one other of said predetermined set of criteria.

12. The apparatus of claim 7 wherein said means for determining whether said code is authentic is performed by said virtual machine.

13. The apparatus of claim 7 wherein said device is a small footprint device.

14. The apparatus of claim 7 wherein said device is a portable product.

15. The apparatus of claim 7 wherein said device comprises a tamper-resistant package.

16. The apparatus of claim 7, further comprising means for, if said code is determined to be not authentic, operating said virtual machine according to said virtual machine code.

17. The apparatus of claim 7 wherein said means for determining whether said code is authentic comprises means for determining whether said code is from a trusted source.

18. The apparatus of claim 17 wherein said means for determining whether said code is authentic further comprises means for determining whether said code has not been corrupted since being sent by said trusted source.

19. The apparatus of claim 7 wherein said means for operating said virtual machine comprises means for converting said virtual machine code to native code of said microcontroller with a just-in-time compiler.

20. The apparatus of claim 7 wherein said virtual machine code is a native code of the microcontroller.

21. An apparatus for programming a device having a microcontroller configured to execute a virtual machine and a port to a communications link from a remote computer connected to the communications link, the apparatus comprising:

means for verifying at said remote computer that particular virtual machine code for use by said virtual machine conforms to at least some of a predetermined set of criteria;

means for, if the particular virtual machine code passes verifying, generating at least one indicator of authenticity, and sending code including the particular virtual machine code and said at least one indicator of authenticity from said remote computer to said device over said communications link.

22. The apparatus of claim 21 wherein said device is a small footprint device.

23. The apparatus of claim 21 wherein said device is a portable product.

24. The apparatus of claim 21 wherein said device comprises a tamper-resistant package.

25. The apparatus of claim 21 wherein said at least one indicator of authenticity comprises an indication that the code is from a trusted source and an indication that the particular virtual machine code has not been corrupted since being sent by the trusted source.

26. The apparatus of claim 21 wherein said particular virtual machine code comprises bytecode.

27. The apparatus of claim 21 wherein said means for verifying comprises means for verifying that said particular virtual machine code conforms to substantially all of said predetermined set of criteria.

28. An apparatus for programming a device having a microcontroller configured to execute a virtual machine and a port to a communications link from a remote computer connected to the communications link, the apparatus comprising:
- means for verifying at said remote computer that particular virtual machine code for use by said virtual machine conforms to at least some of a predetermined set of criteria;
- if said particular virtual machine code passes said verifying, then
  - means for generating at least one indicator of authenticity, and
  - means for sending code including said particular virtual machine code and said at least one indicator of authenticity from said remote computer to said device over said communications link;
- means for receiving said code through said port at said device;
- means for determining at the device whether said code is authentic in response to the at least one indicator of authenticity; and
- means for, if said code is determined to be authentic,
  - omitting verification that said particular virtual machine code conforms to said at least same of the predetermined set of criteria, and
  - operating the virtual machine according to said particular virtual machine code.

29. The apparatus of claim 28 wherein said device is a small footprint device.

30. The apparatus of claim 28 wherein said device is a portable product.

31. The apparatus of claim 28 wherein said device comprises a tamper-resistant package.

32. The apparatus of claim 28 wherein said virtual machine code comprises bytecode.

33. The apparatus of claim 28 wherein said at least some of the predetermined set of criteria comprises substantially all of said predetermined set of criteria.

34. The apparatus of claim 28 wherein said at least one indicator of authenticity comprises an indication that said code is from a trusted source and an indication that said particular virtual machine code has not been corrupted since being sent by said trusted source.

35. The apparatus of claim 28, further comprising means for, if said code is determined to be authentic, verifying said particular virtual machine code conforms to at least one other of said predetermined set of criteria.

36. The apparatus of claim 28 wherein said means for determining whether said code is authentic is performed by said virtual machine.

37. The apparatus of claim 28, further comprising means for, if said code is determined to be not authentic, operating said virtual machine according to said particular code.

38. An apparatus for controlling a device having an external port and a microcontroller configured to run a virtual machine, the apparatus comprising:
- means for receiving through the port, code including virtual machine code for use by said virtual machine;
- means for determining whether said code is authentic in response to an indicator of authenticity provided within said code; and
- means for, if said code is determined to be authentic,
  - omitting processing of staid virtual machine code according to at least some of a predetermined set of processes, and
  - operating said device in response to said virtual machine code.

39. A memory for storing data for access by an application program being executed on a data processing system, comprising:
- a data structure stored in said memory, said data structure including information used by said program to control a device having an external port and a microcontroller configured to execute a virtual machine, said data structure comprising one or more verified bytecodes and a proof of authenticity, said proof of authenticity for determining whether to verify said one or more bytecodes conform to at least some of a predetermined set of criteria prior to operating said device in response to said verified bytecodes.

40. The memory of claim 39 wherein said proof of authenticity comprises a hash value.

41. The memory of claim 39 wherein said proof of authenticity comprises a message authentication code using a block-cipher algorithm.

42. The memory of claim 39 wherein said proof of authenticity comprises a digital signature using an symmetric cyrptographic algorithm.

* * * * *

UNITED STATES PATENT AND TRADEMARK OFFICE
CERTIFICATE OF CORRECTION

PATENT NO. : 6,640,279 B2
DATED : October 28, 2003
INVENTOR(S) : Moshe Levy and Judy Schwabe It is certified that error appears in the above-identified patent and that said Letters Patent is hereby corrected as shown below:

<u>Column 7,</u>
Line 48, replace "initialing" with -- initializing --.

<u>Column 10,</u>
Line 53, replace "configure" with -- configured --.

<u>Column 13,</u>
Line 25, replace "same" with -- some --.

<u>Column 14,</u>
Line 18, replace "staid" with -- said --.
Lines 42-43, replace "symmetric" with -- asymmetric --.

Signed and Sealed this

Thirtieth Day of March, 2004

JON W. DUDAS
*Acting Director of the United States Patent and Trademark Office*